United States Patent [19]
Sugiyama et al.
[11] 4,303,928
[45] Dec. 1, 1981

[54] PRINTER HEAD ASSEMBLY FOR AN INK JET SYSTEM PRINTER OF THE CHARGE AMPLITUDE CONTROLLING TYPE

[75] Inventors: Kiyoshi Sugiyama; Masaharu Matsuba, both of Yokosuka; Fusao Iwagami, Higashiosaka; Khoki Fukumoto, Yamatokoriyama, all of Japan

[73] Assignees: Nippon Telegraph & Telephone Public Corp., Tokyo; Sharp Kabushiki Kaisha, Osaka, both of Japan

[21] Appl. No.: 82,885

[22] Filed: Oct. 9, 1979

Related U.S. Application Data

[63] Continuation of Ser. No. 839,392, Oct. 4, 1977, abandoned.

[30] Foreign Application Priority Data

Oct. 4, 1976 [JP] Japan ............................... 51-119700

[51] Int. Cl.³ ............................................ G01D 15/18
[52] U.S. Cl. .................................. 346/75; 346/140 R
[58] Field of Search .............................. 346/75, 140 R

[56] References Cited

U.S. PATENT DOCUMENTS

| | | | |
|---|---|---|---|
| 3,458,762 | 7/1969 | Ascoli | 346/75 X |
| 3,512,172 | 5/1970 | Colecchi | 346/75 |
| 3,564,120 | 2/1971 | Taylor | 346/75 X |
| 3,708,118 | 1/1973 | Keur | 346/75 X |
| 3,786,516 | 1/1974 | Kashio | 346/75 |
| 3,831,727 | 8/1974 | Kruspe | 346/75 X |
| 3,953,860 | 4/1976 | Fujimoto | 346/75 |
| 3,972,052 | 7/1976 | Atumi | 346/75 |
| 4,050,076 | 9/1977 | Takano | 346/75 |

OTHER PUBLICATIONS

Pelkie et al.; Cassette Ink Jet Head; IBM Tech. Disc. Bulletin; vol. 17, No. 9, Feb. 1975, pp. 2622-2623.

*Primary Examiner*—Joseph W. Hartary
*Attorney, Agent, or Firm*—Birch, Stewart, Kolasch and Birch

[57] ABSTRACT

A nozzle for issuing ink liquid, a vibrator for exciting the nozzle to emit ink droplets of a given frequency, and a charging electrode for charging the ink droplets in accordance with print information are arranged within a cylinder shaped housing. One end of the cylinder shaped housing is covered by a wall having an opening at the center thereof through which charged ink droplets are propelled. A fixing plate is attached to the other end of the cylinder shaped housing for tightly securing the nozzle, the vibrator and the charging electrode within the cylinder shaped housing.

18 Claims, 2 Drawing Figures

PRINTER HEAD ASSEMBLY FOR AN INK JET SYSTEM PRINTER OF THE CHARGE AMPLITUDE CONTROLLING TYPE

This application is a continuation, of copending application Ser. No. 839,392, filed on Oct. 4, 1977 now abandoned.

BACKGROUND OF THE INVENTION

The present invention relates to an ink jet system printer of the charge amplitude controlling type and, more particularly, to a printer head of an ink jet system printer for emitting charged ink droplets.

Generally, in an ink jet system printer of the charge amplitude controlling type, a stream of ink droplets having a given frequency is emitted from a nozzle toward a record receiving paper and each ink droplet is charged to a desired amplitude in accordance with a video signal through the use of a charging electrode. Each ink droplet is deflected in the vertical direction as it passes through a fixed high voltage field established by a pair of deflection plates in accordance with the charge amplitude carried thereon and deposited on the record receiving paper. The nozzle, a vibrator for exciting the nozzle at the given frequency, and the charging electrode are mounted on a carriage which is driven to travel in the horizontal direction at a fixed speed during print operation, whereby printing is performed in a dot matrix fashion.

A typical construction of the ink jet system printer of the charge amplitude controlling type is disclosed in U.S. Pat. No. 3,555,558 entitled "INK DROP WRITING APPARATUS WITH DATA SYNCHRONIZING MEANS" patented on Jan. 12, 1971. An example of a carriage drive mechanism is described in U.S. Pat. No. 4,050,076 entitled "DEFLECTION MEANS INCLUDING A DEFLECTION ELECTRODE MOUNTED ON A TRAVELLING CARRIAGE IN AN INK JET SYSTEM PRINTER" issued on Sept. 20, 1977.

OBJECTS AND SUMMARY OF THE INVENTION

Accordingly, an object of the present invention is to provide a novel printer head including a nozzle, an electromechanical transducer and a charging electrode in an ink jet system printer of the charge amplitude controlling type.

Another object of the present invention is to facilitate installation of a printer head on a carriage in an ink jet system printer of the charge amplitude controlling type.

Still another object of the present invention is to provide a printer head of a compact size for use in an ink jet system printer of the charge amplitude controlling type.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a nozzle for issuing ink liquid, a vibrator for exciting the nozzle to emit ink droplets of a given frequency, a charging electrode for charging the ink droplets in accordance with print information, and a sensing electrode for detecting the charge on the ink droplets are installed within a cylinder shaped housing. One end of the cylinder shaped housing is covered by a wall having an opening at the center thereof through which charged ink droplets are propelled. A fixing plate is attached to the other end of the cylinder shaped housing for tightly securing the nozzle, the vibrator, the charging electrode and the sensing electrode within the cylinder shaped housing.

In a preferred form, the fixing plate is secured to a carriage through the use of screws. The securing of the nozzle, the vibrator, the charging electrode and the sensing electrode within the cylinder shaped housing is adjustable through the use of the screws.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
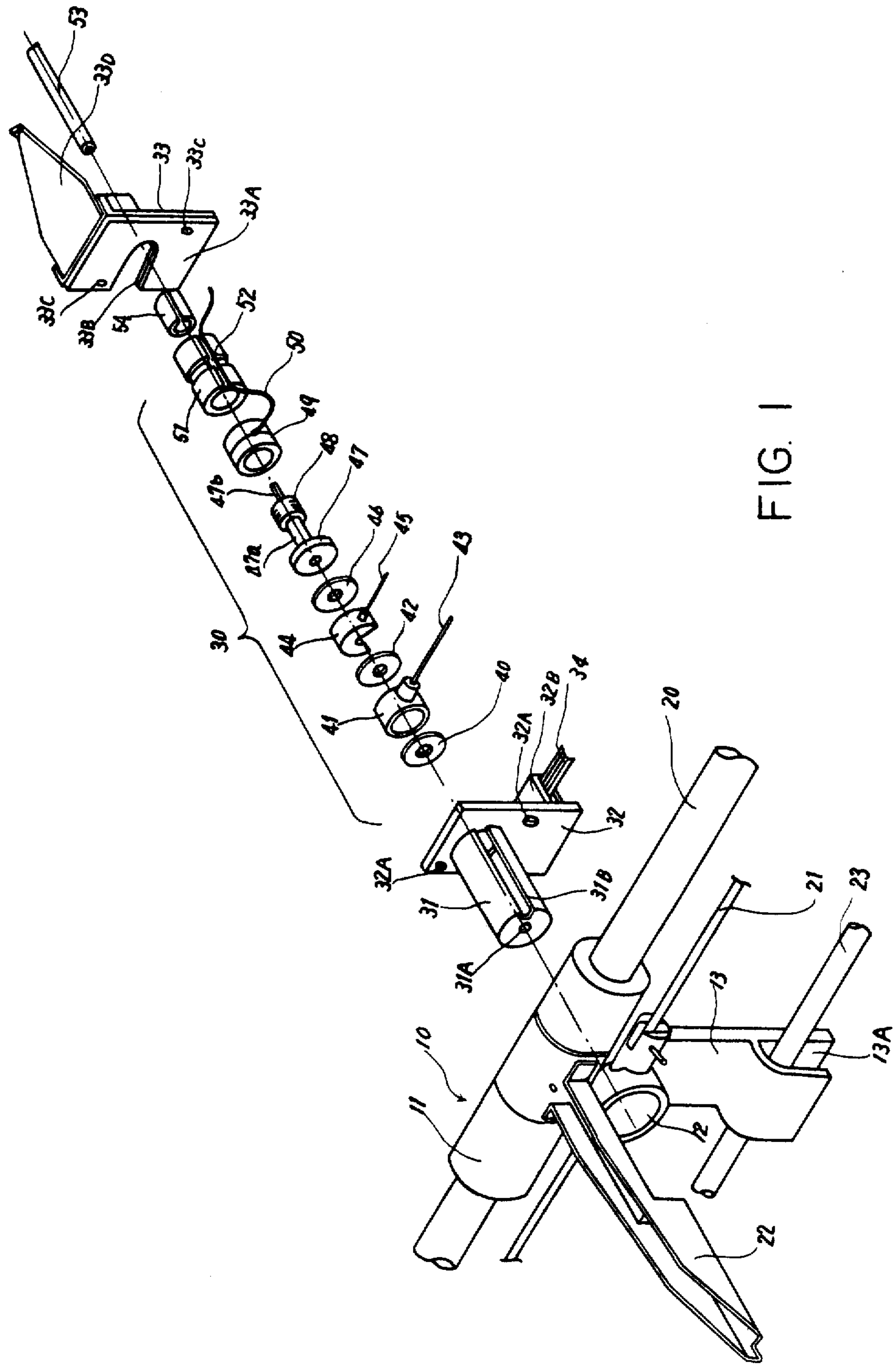
FIG. 1 is an exploded perspective view of an embodiment of a printer head of an ink jet system printer of the charge amplitude controlling type of the present invention.

FIG. 1 shows an exploded printer head of an embodiment of the present invention and a carriage for carrying the printer head.

A carriage 10 mainly comprises a supporter 11 for slidably supporting the carriage 10 on a shaft 20, a cylinder hole 12 provided below the supporter 11, and an extended leaf 13. The cylinder hole 12 functions to accommodate a printer head, and a wire 21 is fixed to the extended leaf 13 for driving the carriage 10 along the shaft 20.

A slim deflection electrode 22 is secured to the carriage 10. The slim deflection electrode 22 is maintained at the ground potential and functions to create a constant high-voltage deflection field in combination with a counter deflection electrode mounted on the body of the ink jet system printer (not shown). Detailed constructions of the slim deflection electrode 22 and the carriage drive mechanism are described in U.S. Pat. No. 4,050,076 entitled "DEFLECTION MEANS INCLUDING A DEFLECTION ELECTRODE MOUNTED ON A TRAVELLING CARRIAGE IN AN INK JET SYSTEM PRINTER" issued on Sept. 20, 1977.

The bottom end of the extended leaf 13 branches to form a guide section 13A which is associated with a guide shaft 23. With such an arrangement, the carriage 10 is driven to travel in the horizontal direction, or, along the shaft 20 and the guide shaft 23. The horizontal direction corresponds to the row direction of a matrix pattern to be printed.

A printer head 30 mainly comprises a cylinder shaped housing 31 one end of which is covered by a wall, a supporting plate 32 integrally secured to the other end of the cylinder shaped housing 31, and a fixing plate 33 for covering the opening of the cylinder shaped housing 31. The supporting plate 32 and the fixing plate 33 function, in combination, to secure the printer head 30 to the carriage 10. The fixing plate 33 also functions to tightly secure various components of the printer head within the cylinder shaped housing 31.

An opening 31A is formed in the wall covering one end of the cylinder shaped housing 31. A guide slit 31B is provided along the longitudinal axis of the cylinder shaped housing 31 for guiding the various components of the printer head to predetermined positions within the cylinder shaped housing 31.

The supporting plate 32 has tapped holes 32A, and the fixing plate 33 has tapped holes 33C. The fixing plate 33 is attached to the extended leaf 13 of the carriage 10 with the intervention of the supporting plate 32 through the use of screws secured through the tapped holes 32A and 33C. The cylinder shaped housing 31 is installed within the cylinder hole 12 of the carriage 10. Control signal transmission cables 34 are engaged to a supporter 32B integral with the supporting plate 32 for applying control signals to the printer head.

A phase sensor 41 is installed within the cylinder shaped housing 31 with the intervention of a shielding metal cap 40 between the wall covering one end of the cylinder shaped housing 31. The phase sensor 41 functions to detect the charge amplitude carried on the ink droplets for achieving the phase synchronization between the application of charging signals and the ink drop separation phase. Detection outputs of the phase sensor 41 are applied to a phase control circuit through a signal line 43.

A typical mode of operation of the phase sensor 41 is described in U.S. Pat. No. 3,836,912 entitled "DROP CHARGE SENSING APPARATUS FOR AN INK JET PRINTING SYSTEM" issued on Sept. 17, 1974. A typical construction of the phase sensor 41 is described in detail in U.S. Pat. No. 3,953,860 entitled "CHARGE AMPLITUDE DETECTION FOR INK JET SYSTEM PRINTER" issued on Apr. 27, 1976.

An example of the phase synchronization system is described in U.S. Pat. No. 3,769,632 entitled "DIGITAL PHASE CONTROL FOR AN INK JET RECORDING SYSTEM" issued on Oct. 30, 1973. Another example of the phase synchronization system is described in U.S. Pat. No. 4,025,926 entitled "PHASE SYNCHRONIZATION FOR INK JET SYSTEM PRINTER" issued on May 24, 1977.

An insulation spacer 42 and a charging electrode 44 is installed within the cylinder shaped housing 31 in such a manner as to contact the phase sensor 41. A signal transmission wire 45 is attached to the charging electrode 44 in order to charge ink droplets in accordance with print information or the video signal.

At the back of the charging electrode 44, an insulation spacer 46 and a nozzle 47 are disposed. A screw portion 48 is formed at the rear end of the nozzle 47. An electromechanical transducer 49 is attached to a middle portion **47*a* of the nozzle 47 with the intervention of an insulation tube 62 (see FIG. 2) therebetween. The electromechanical transducer 49 receives exciting signals through a signal wire 50, whereby ink droplets of a given frequency are emitted from the nozzle 47. A counter weight 51 which has a tapped internal face is engaged to the screw portion 48 of the nozzle 47**.

The counter weight 51 is made of metal and functions to tightly secure one end of the nozzle 47, whereby the nozzle 47 is vibrated by the electromechanical transducer 49 in a fashion that the counter weight 51 is the fulcrum of the vibration. The counter weight 51 also functions to prevent the transmission of the vibration to other parts of the system.

A groove 52 is formed on the side wall of the counter weight 51. The signal wire 50 is secured within the groove 52 and attached to the groove 52 through the use of preferred adhesive. In this way, optimum vibration of the electromechanical transducer 49 is ensured even when tension is erroneously applied to the signal wire 50. The rear end **47*b* of the nozzle 47 is communicated to an ink liquid supply conduit 53 provided through the counter weight 51. A connection point of the rear end 47*b* of the nozzle 47 and the ink liquid supply conduit 53 is tightly secured by a holder 54**.

Figure 2:
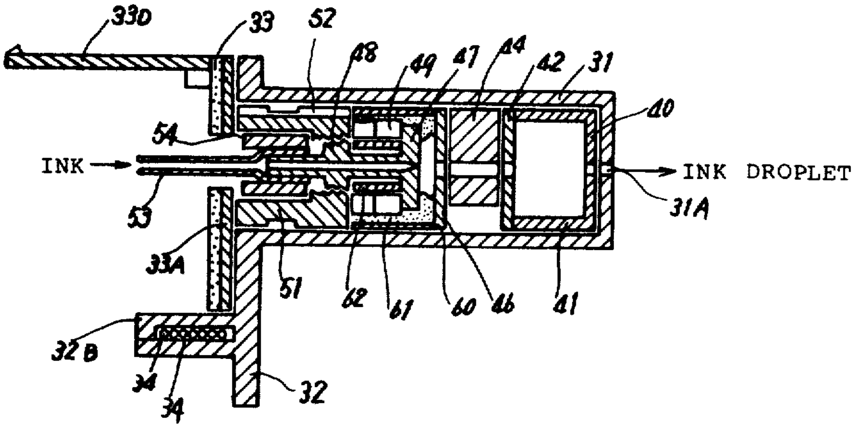
FIG. 2 is a sectional view of the printer head of the present invention.

FIG. 2 is a sectional view of the printer head 30. Like elements corresponding to those of FIG. 1 are indicated by like numerals. A tube 60 is provided around the nozzle 47 and the electromechanical transducer 49 which are interposed between the insulation spacer 46 and the counter weight 51. A resilient insulator 61 made of, for example, silicon resin is disposed between the tube 60 and the nozzle 47 and the electromechanical transducer 49, whereby the vibration of the electromechanical transducer 49 is ensured and the leakage of electric energy from the electromechanical transducer 49 is prevented. The leakage of the electric energy will occur when the resilient insulator 61 is not disposed, since the ink liquid emitted from the nozzle 47 may be filled around the electromechanical transducer 49.

The above-mentioned various components of the printer head are not fixed with respect to the cylinder shaped housing 31. The respective positions of the printer head components are fixed by attaching the fixing plate 33 to the open end of the cylinder shaped housing 31. A resilient plate 33A is attached to the fixing plate 33 so that tight connection is achieved between the supporting plate 32 and the fixing plate 33 when the printer head is secured to the carriage 10 through the use of screws and the tapped holes 32A and 33C. An indent 33B is formed in the fixing plate 33 through which the ink liquid supply conduit 53 is disposed.

The resilient plate 33A functions to apply a preferred pressure to the printer head components to tightly secure them. And the resilient plate 33A functions to absorb any vibrations occurred within the printer head.

An extended leaf 33D is fixed to the upper end of the fixing plate 33. An end of the extended leaf 33D is shaped slim, whereby the slim shaped end of the extended leaf 33D functions as an indicator for indicating the printing position.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In combination with an ink jet system printer of the charge amplitude controlling type, said printer emitting ink droplets charged with print information from a printer head, said printer head being carried by a carriage travelling in the lateral direction, the charged ink droplets travelling toward a record receiving member and being selectively deflected in the vertical direction and in a dot matrix fashion when passing through a constant high-voltage deflection field established by a pair of deflection electrodes, thereby recording desired symbols on said record receiving member, said printer head comprising:

housing means, having a longitudingal axis, for protectively enclosing various components of said ink jet system printer head within said housing means, said housing means having an end wall means covering a first end of said housing means and a peripheral wall means attached to said end wall means for protectively enclosing the various components of said ink jet system printer;

an opening formed in said end wall means;

nozzle means enclosed within the peripheral wall means of said housing means for emitting ink liquid therefrom, said ink liquid being emitted through said opening formed in said end wall means;

vibrator means enclosed within the peripheral wall means of said housing means for exciting said nozzle means to form said ink droplets having a given frequency of emittance, said vibrator means being attached to said nozzle means;

charging electrode means enclosed within the peripheral wall means of said housing means for charging said ink droplets emitted from said nozzle means in accordance with said print information, said ink droplets having a predetermined charge amplitude;

guide slit means formed along the longitudinal axis of said housing means for providing access to said nozzle means, said vibrator means, and said charging electrode means to guide the installation of said nozzle means, said vibrator means and said charging electrode means along predetermined positions within said housing means; and plate means attached to a second end of said housing means for tightly compressing and holding said nozzle means, said vibrator means and said charging electrode means in secure contact with each other along said longitudinal axis of said housing means, said nozzle means, said vibrator means, and said charging electrode means being unattached to said peripheral wall means of said housing means and being spaced a certain distance therefrom to permit such compressing by said plate means.

2. The combination of claim 1, wherein said vibrator means comprises an electromechanical transducer means attached to said nozzle means, said transducer means and said nozzle means having an insulation tube means mounted therebetween.

3. The combination of claim 1, further comprising a phase sensor means enclosed within the peripheral wall means of said housing means for detecting the amplitude of said charge carried on said ink droplets, said phase sensor means being disposed in front of said charging electrode means within said housing means and being held tightly in contact with said charging electrode means along the longitudinal axis of said housing means by said plate means.

4. The combination of claim 1, further comprising a leaf is attached to the upper end of said plate means, the free end of said leaf being shaped slim to indicate a printing position.

5. The combination of claim 1, wherein said housing means is cylindrical in shape.

6. A printer head for use with printing systems of the charge amplitude controlling type and connected to a source of supply of an ink liquid used in creating print information, comprising:

nozzle means responsive to said supply of said ink liquid for emitting a stream of ink droplets therefrom;

vibrator means connected to said nozzle means for vibrator means connected to said nozzle means for vibrating said nozzle means thereby creating said stream of ink droplets, said stream of ink droplets having a predetermined frequency of emittance;

charging means disposed in front of said nozzle means for imposing an electrostatic charge on each of said ink droplets in the ink stream, said charge on each of said ink droplets being indicative of certain characteristics associated with said print information;

housing means for protectively enclosing said vibrator means, said nozzle means, and said charging means within said housing means, said housing means having a first end, a second end, and a peripheral wall extending between said first and second end for protectively enclosing said vibrator means, said nozzle means, and said charging means, said first end comprising a wall means including an aperture means for passing ink droplets therethrough;

guide slit means longitudinally arranged along the periphery of said housing means for providing access to said nozzle means, said vibrator means, and said charging means to guide installation of said nozzle means, said vibrator means, and said charging means along predetermined positions within said housing means; and plate means connected to the second end of said housing means for tightly compressing and holding said vibrator means, said nozzle means, and said charging means in secure contact with each other along the longitudinal axis of said housing means, said vibrator means, said nozzle means, and said charging means being unattached to said peripheral wall of said housing means and being spaced a certain distance therefrom.

7. A printer head in accordance with claim 6, further comprising:

sensing means disposed along the longitudinal axis of said housing means and responsive to said flow of said ink droplets from said charging means for sensing said charge carried by each of said ink droplets, said sensing means being disposed in front of said charging means and held tightly in secure contact with said charging means along the longitudinal axis of said housing means by said plate means, said sensing means being unattached to said peripheral wall of said housing means.

8. A printer head in accordance with claim 6, wherein said plate means further includes a resilient plate located at said second end of said housing means for tightly holding said vibrator means, said nozzle means, and said charging means in contact with each other along the longitudinal axis of said housing means.

9. A printer head in accordance with claim 8, wherein said resilient plate has a port means defined therethrough for allowing the introduction of said supply of ink liquid into said printer head; and wherein said plate means further includes a fixing plate fixed to said resilient plate for securing said resilient plate to said second end of said housing means.

10. A printer head in accordance with claim 9, wherein said fixing plate further includes:

position indicating means for indicating the printing position of said printer head, said position indicating means including an extended leaf member attached to said plate means, said member having a slim shaped end pointing generally in the opposite direction relative to said printer head when undergoing printing operations.

11. A printer head in accordance with claim 10, wherein said housing means further includes:

supporting plate means integrally attached to said housing means for attachment to said fixing plate via said resilient plate, said fixing plate having a second port means defined therethrough, said supporting plate having a third port means defined therethrough and in registry with the said second port means in said fixing plate and the first said port means in said resilient plate, said fixing plate being firmly attached to said supporting plate via said resilient plate thereby tightly holding said vibrator means, said nozzle means and said charging means in contact with each other along the longitudinal axis of said housing means.

12. A printer head in accordance with claim 6, wherein said vibrator means comprises an electromechanical transducer means.

13. A printer head in accordance with claim 6, wherein said plate means further includes a resilient plate located at said second end of said housing means for tightly holding said vibrator means, said nozzle means, and said charging means in contact with each other along the longitudinal axis of said housing means.

14. A printer head in accordance with claim 13, wherein said resilient plate has a port means defined therethrough for allowing the introduction of said supply of said ink liquid into said printer head; and wherein said plate means further includes a fixing plate fixed to said resilient plate for securing said resilient plate to said second end of said housing means.

15. A printer head in accordance with claim 14, wherein said fixing plate further includes:

position indicating means for including an extended leaf member attached to said plate means, said member having a slim shaped end pointing generally in the opposite direction relative to said printer head when undergoing printing operations.

16. A printer head in accordance with claim 15, wherein said housing means further includes:

supporting plate means integrally attached to said housing means for attachment to said fixing plate via said resilient plate, said fixing plate having a second port means defined therethrough, said supporting plate having a third port means defined therethrough and in registry with said second port means in said fixing plate and the first port means in said resilient plate, said fixing plate being firmly attached to said supporting plate via said resilient plate thereby tightly holding said vibrator means, said nozzle means and said charging means in contact with each other along the longitudinal axis of said housing means.

17. A printer head in accordance with claims 6, 11, or 16 further comprising resilient insulating means disposed between said vibrating means and the outer peripheral wall of said housing means for preventing the leakage of electric energy from said vibrating means.

18. A printer head in accordance with claim 6 wherein:

said vibrator means comprise an electromechanical transducer means;

said nozzle means further comprises a shaft and a screw thread portion attached to one end of said shaft; and said printer head further comprises counter weight means disposed between said transducer means and said plate means for engaging with the screw thread portion on said shaft of said nozzle means, said transducer means being disposed around the shaft of said nozzle means when said counter weight means is engaged with the screw thread portion, said counter weight means providing a fulcrum for the vibration from said transducer means and preventing the vibration of said transducer means from transmitting throughout said printer head.

* * * * *